(12) United States Patent
Laari et al.

(10) Patent No.: US 11,438,427 B2
(45) Date of Patent: Sep. 6, 2022

(54) DISCOVERY OF RESOURCES IN A LOCAL NETWORK

(71) Applicant: TELEFONAKTIEBOLAGET LM ERICSSON (PUBL), Stockholm (SE)

(72) Inventors: Petri Laari, Espoo (FI); Ari Keränen, Helsinki (FI); Jan Melén, Espoo (FI)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 136 days.

(21) Appl. No.: 15/743,238

(22) PCT Filed: Jul. 10, 2015

(86) PCT No.: PCT/SE2015/050818
§ 371 (c)(1),
(2) Date: Jan. 9, 2018

(87) PCT Pub. No.: WO2017/010921
PCT Pub. Date: Jan. 19, 2017

(65) Prior Publication Data
US 2019/0230167 A1    Jul. 25, 2019

(51) Int. Cl.
*H04L 67/12* (2022.01)
*H04L 67/51* (2022.01)
(Continued)

(52) U.S. Cl.
CPC .............. *H04L 67/16* (2013.01); *H04L 12/66* (2013.01); *H04L 41/12* (2013.01); *H04L 47/82* (2013.01);
(Continued)

(58) Field of Classification Search
None
See application file for complete search history.

(56) References Cited

U.S. PATENT DOCUMENTS

| 10,476,926 B2 | 11/2019 | Phillips et al. |
| 2014/0369251 A1 | 12/2014 | Zhang |

(Continued)

FOREIGN PATENT DOCUMENTS

| CN | 101707595 A | 5/2010 |
| CN | 104615462 A | 5/2010 |

(Continued)

OTHER PUBLICATIONS

Z. Shelby, CoRE Resource Directory (Year: 2015).*
(Continued)

*Primary Examiner* — Cai Y Chen
(74) *Attorney, Agent, or Firm* — Rothwell, Figg, Ernst & Manbeck, P.C.

(57) ABSTRACT

There is provided mechanisms for making resources discoverable. A method is performed by a resource location mapping node. The method comprises acquiring scope information of a local network and location information enabling determination of specific locations of resources in the local network. The method comprises generating Constrained Application Protocol (CoAP) resource identifiers of the resources from the scope information and the location information. The method comprises providing the CoAP resource identifiers to a resource directory, thereby making the resources discoverable.

22 Claims, 7 Drawing Sheets

(51) Int. Cl.

| | |
|---|---|
| *H04L 61/4511* | (2022.01) |
| *H04L 61/5076* | (2022.01) |
| *H04L 47/70* | (2022.01) |
| *H04L 61/106* | (2022.01) |
| *H04L 12/66* | (2006.01) |
| *H04L 41/12* | (2022.01) |
| *H04L 101/659* | (2022.01) |
| *H04L 67/01* | (2022.01) |
| *H04L 67/63* | (2022.01) |

(52) U.S. Cl.
CPC ........ *H04L 61/106* (2013.01); *H04L 61/1511* (2013.01); *H04L 61/2076* (2013.01); *H04L 61/6059* (2013.01); *H04L 67/12* (2013.01); *H04L 67/42* (2013.01); *H04L 67/327* (2013.01)

(56) References Cited

U.S. PATENT DOCUMENTS

| | | | |
|---|---|---|---|
| 2015/0095514 A1 | 4/2015 | Yu | |
| 2016/0218992 A1* | 7/2016 | Hong | ............... H04L 67/02 |
| 2019/0014615 A1* | 1/2019 | Wang | ............... H04L 12/1872 |

FOREIGN PATENT DOCUMENTS

| | | |
|---|---|---|
| CN | 103200209 A | 7/2013 |
| WO | 2016093749 A1 | 6/2016 |

OTHER PUBLICATIONS

Jokela-Petri, Line Speed Publish (Year: 2015).*
Z.Shelby, Constraint Application Protocol (CoAP) (Year: 2013).*
Shelby, CoRE Resource Directory, Jul. 6, 2015 (Year: 2015).*
International Search Report and Written Opinion dated Mar. 29, 2016, in International Application No. PCT/SE2015/050818, 9 pages.
Koster et al., "Publish-Subscribe Broker for the Constrained Application Protocol (CoAP), draft-koster-core-coap-pubsub-02" Network Working Group, Internet-Draft, 2015, 19 pages.
Koster et al., "Message Queueing in the Constrained Application Protocol (CoAP), draft-koster-core-coapmq-00.txt" Network Working Group, Internet-Draft, 2014, 16 pages.
Hartke, "A CoAP REST API for XMPP Publish-Subscribe, draft-hartke-core-coap-xmpp-00" CoRE Working Group, Internet-Draft, 2012, 16 pages.
Shelby et al., "CoRE Resource Directory draft-ietf-core-resource-directory-01" CoRE Internet-Draft, 2013, 25 pages.
Shelby et al., "Constrained Application Protocol (CoAP) draft-ietf-core-coap-18" CoRE Working Group, Internet-Draft, 2013, 105 pages.
Jokela et al., "LIPSIN: Line Speed Publish/Subscribe Inter-Networking" SIGCOMM, 2009, pp. 195-206.
Extended European Search Report dated Jun. 8, 2018, issued in European Patent Application No. 15898412.0, 8 pages.
Shelby et al. "CoRE Resource Directory draft-ietf-core-resource-directory-04" CoRE Internet-Draft, 2015, 49 pages.
Krol et al. "Featurecast: Data-Centric Group Communication; draft-krol-core-featurecast-00" Network Working Group Internet-Draft, 2014, 12 pages.
Shelby et al. "The Constrained Application Protocol (CoAP)" Internet Engineering Task Force (IETF) RFC 7252, 2014, 112 pages.
Trossen "Design and Realization of an Information-centric Networking Architecture", 2012, retrieved from the internet http://fp7pursuit.ipower.com/PursuitWeb/wp-content/uploads/2012/11/AsiaFI-summer-school-Aug-12.pdf, 38 pages.
Chinese Office Action dated Jun. 23, 2020, issued in Chinese Patent Application No. 201580081602.7, 5 pages.

* cited by examiner

Resource Directroy coap://livingroom.example.com/
coap://livingroom.example.com/lamp1
coap://livingroom.example.com/lamp2
...

DISCOVERY OF RESOURCES IN A LOCAL NETWORK

CROSS REFERENCE TO RELATED APPLICATION(S)

This application is a 35 U.S.C. § 371 National Phase Entry Application from PCT/SE2015/050818, filed Jul. 10, 2015, designating the United States, the disclosure of which is incorporated herein in its entirety by reference.

TECHNICAL FIELD

Embodiments presented herein relate to discovery, and particularly to a method, a resource location mapping node, a computer program, and a computer program product for making resources in a local network discoverable.

BACKGROUND

In communications networks, there may be a challenge to obtain good performance and capacity for a given communications protocol, its parameters and the physical environment in which the communications network is deployed.

Web protocols, such as the Hypertext Transfer Protocol (HTTP) and the Constrained Application Protocol (CoAP), use uniform resource identifiers (URIs) for referencing to resources that are hosted on servers. There URIs can be discovered from a document that uses hyperlinking (e.g., the HyperText Markup Language (HTML)) or they can be stored in a directory, such as the Constrained RESTful Environment (CoRE) Resource Directory (RD). The authority part of the URI comprises the address of the server hosting the resource whereas the path part comprises the path to the resource on that server. Traditionally the path referred to a set of file system directories on the server but today using virtual URIs have enabled the servers to dynamically map different URIs to various resources in the server(s).

When an RD is used for discovering resources, a client queries the RD for resources matching to a certain criteria and the RD returns a list of web-links defining the URIs to there resources.

Publish-subscribe (pub-sub) and Information Centric Networking (ICN) paradigms shift from addressing hosts into addressing information and introduce a concept of "scopes" where instead of defining addresses and paths to resources, hierarchies of scopes and resources within those scopes can be defined, addressing the resources without the need to define the server(s) where those resources are hosted. An illustrative example of an ICN scope would be lights of a room in a house: these lights can be presented, for example, as a scope "house:kitchen:lights" or "house:livingroom: lights". A single resource can also belong to multiple scopes, e.g., "house:groundfloor:light1" and "house:kitchen:light1". The ICN rendezvous layer will translate the scopes into instructions for the forwarding layer that will in turn forward the queries for a resource to the right server.

The scoping of house information could be for example as presented in FIG. 1. FIG. 1 provides a hierarchical structure 100 of scope based information identification. The hierarchical structure 100 comprises a top level as represented by the entity House 101. One level below the entity House are the entities Livingroom 102, Kitchen 103, Lights 104, and Sensors 105. These entities 102-105 are thus part of the entity House 101. Finally, on a bottom level are entities Lamp1 106, Lamp2 107, Lamp3 108, Sensor1 109, and Sensor2 110. The entities 106-110 are termed resources. Connections indicate how the entities 106-110 relate to the entities 102-105. For example, Livingroom 102 is associated with Lamp 1106, Lamp2 107, and Sensor1 109. Hence, in a real-life scenario this would correspond to a situation where a house comprises a living room and where the living room has two lights (as represented by Lamp1 and Lamp2) and one sensor (as represented by Sensor1). FIG. 1 provides a schematic illustration of scoping that is used in Information Centric Networking to address information for the present information. For example, Lamp 1 can be addressed using either scope House:Livingroom:Lamp1 or House:Lights: Lamp1.

An ICN subscriber can subscribe to information based on these scopes, e.g. for lights in livingroom (subscribe: house- →livingroom), for all lights (subscribe:house→lights), and for a specific lamp (house→kitchen→light 3). The rendezvous system creates the required paths with help from a Topology Manager (TM) and a corresponding Forwarding Identifier (Fid). An in-packet Bloom filter (iBF) can used as the Fid, and the TM can be responsible for calculating the Fid leading from the resource to the subscribing client. This calculated Fid is then sent to the resource that further uses the Fid to deliver data to the client. This Fid, however, can also be e.g. an IP address, in which case there is no need for the TM, while a rendezvous entity, or resource location mapping node, can directly send the subscribing client's IP address to the resource that sends the requested data to the subscribing client.

While the ICN approach enables efficient addressing of resources, it is not today commonly supported by Internet hosts. A gateway between the ICN network and the Internet is commonly needed to translate between these two networks using different addressing paradigms. However, the resources in the ICN network still need to be discoverable by the hosts in the Internet in order for to build services that use both ICN resources and Internet resources.

Whereas the traditional use of URI paths to resources commonly result in a single path to a single resource, the ICN scopes can be combined in arbitrary ways. For example, with reference to FIG. 1, Lamp 3 can be identified either using ID-path House/Lights/Lamp3 or House/ Kitchen/Lamp3.

Hence, there is still a need for improved mechanisms for making resources discoverable.

SUMMARY

An object of embodiments herein is to provide efficient mechanisms for making resources discoverable.

According to a first aspect there is presented a method for making resources discoverable. The method is performed by a resource location mapping node. The method comprises acquiring scope information of a local network and location information enabling determination of specific locations of resources in the local network. The method comprises generating Constrained Application Protocol (CoAP) resource identifiers of the resources from the scope information and the location information. The method comprises providing the CoAP resource identifiers to a resource directory, thereby making the resources discoverable.

Advantageously this provides an efficient mechanism for making resources discoverable.

Advantageously this enables a flexible mapping of resources to be created in a legacy CoAP network.

Advantageously this enables addressing ICN network entities from traditional Internet Protocol (IP) network in an efficient way, where the host part can describe dynamically changing resources in the host part of the URI.

Advantageously this enables efficient transmission using a single unicast IPv6 address and using iBFs in the IPv6 address to multicast the information to all the resources.

According to a second aspect there is presented a resource location mapping node for making resources discoverable. The resource location mapping node comprises processing circuitry. The processing circuitry is configured to cause the resource location mapping node to perform a set of operations. The set of operations comprises the resource location mapping node to acquire scope information of a local network and location information enabling determination of specific locations of resources in the local network. The set of operations comprises the resource location mapping node to generate Constrained Application Protocol (CoAP) resource identifiers of the resources from the scope information and the location information. The set of operations comprises the resource location mapping node to provide the CoAP resource identifiers to a resource directory thereby making the resources discoverable.

According to a third aspect there is presented a computer program for making resources discoverable, the computer program comprising computer program code which, when run on a resource location mapping node, causes the resource location mapping node to perform a method according to the first aspect.

According to a fourth aspect there is presented a computer program product comprising a computer program according to the third aspect and a computer readable means on which the computer program is stored.

It is to be noted that any feature of the first, second, third and fourth aspects may be applied to any other aspect, wherever appropriate. Likewise, any advantage of the first aspect may equally apply to the second, third, and/or fourth aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which:

FIG. 5 is a schematic diagram illustrating a resource directory according to embodiments;

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

It has, in the context of CoAP, been recognized that also the above pub-sub approach has advantages. According to at least some of the herein disclosed embodiments there is provided mapping between these two identifiers. Particularly, there is presented a mechanism to map pub-sub based information identifiers to CoAP resource identifiers and to publish information from pub-sub hosts to the CoAP-based network. CoAP resource identifiers are using a legacy format to identify a resource by using the host name and a path to the actual resource. In contrast, in Information Centric Networking (ICN), where the pub-sub paradigm is used, the information identification is not based on any specific host name.

Figure 2:
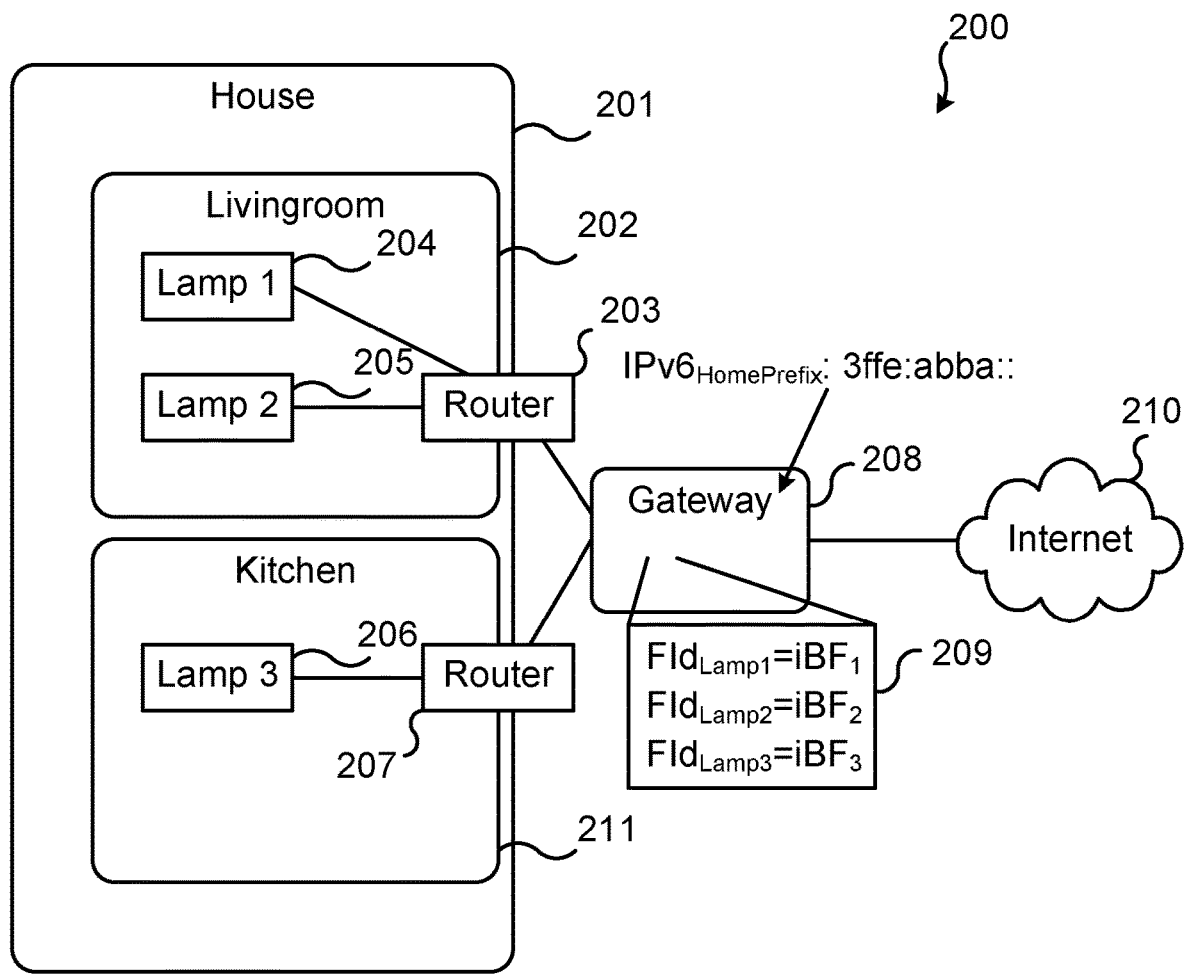
FIG. 2 is a schematic diagram illustrating a physical arrangement of a local network according to embodiments.

FIG. 2 schematically illustrates a physical arrangement 200 of a local network 201 operatively connected to an external network (Internet) 210 via a gateway 208. In the local network, packets are forwarded using in-packet Bloom filters (iBFs). The gateway (GW) 208 maintains the Forwarding Identifier (FId) information 209 to each of the devices 204, 205, 206 (where each device corresponds to a resource) in the local network. In the illustrative example of FIG. 2, the local network 201 corresponds to an entity House comprising an entity Livingroom 202 as accessed by the GW 206 via router 203 and an entity kitchen 211 as accessed by the GW 206 via router 207. For example, the FId to Lamp1 is $iBF_1$. This FId can be used to deliver packets to Lamp1. In this respect, FId is a generic term used for describing the forwarding information; it can also be e.g. an IP address if the local network is IP-based. In FIG. 2, the FIds are iBFs that the GW can use to deliver packets to the corresponding resource in the local network.

The iBFs can be generated in various ways. The local network may have a specific Topology Manager (e.g. Path Computation Element (PCE)) that is aware of the network topology and Link Identifiers used for delivering packets in the iBF forwarding. Based on this information, the PCE may calculate the iBFs for different resources to which the GW requests to deliver packets. iBFs can also be collected automatically for fixed connections or for wireless networks.

As an example, the local network has been assigned a prefix 3ffe:abba. All packets using that prefix in the IP network are delivered to the GW. However, as mentioned above, the local network is not using IP, thus the GW performs an iBF-to-IP address translation, e.g., by embedding an indication of an iBF representation of a resource in an IP address.

The embodiments disclosed herein relate to making resources 106, 107, 108, 109, 110 discoverable (in a local network). In order to make the resources 106, 107, 108, 109, 110 discoverable there is provided a resource location mapping node, a method performed by the resource location mapping node, a computer program comprising code, for example in the form of a computer program product, that when run on a resource location mapping node, causes the resource location mapping node to perform the method.

Figure 8:
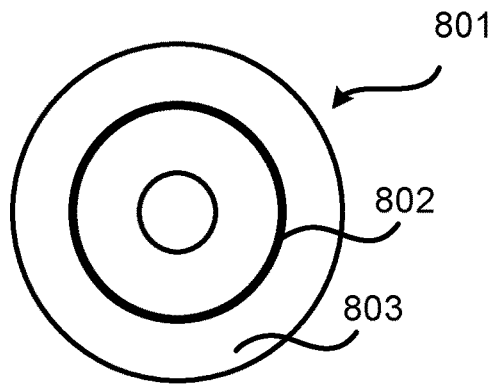
FIG. 8 shows one example of a computer program product comprising computer readable means according to an embodiment.

FIG. 8 schematically illustrates, in terms of a number of functional units, the components of a resource location mapping node 301, 401 according to an embodiment. Processing circuitry 601 is provided using any combination of one or more of a suitable central processing unit (CPU), multiprocessor, microcontroller, digital signal processor (DSP), application specific integrated circuit (ASIC), field programmable gate arrays (FPGA) etc., capable of executing software instructions stored in a computer program product 801 (as in FIG. 8), e.g. in the form of a storage medium 603.

Particularly, the processing circuitry 601 is configured to cause the resource location mapping node 301, 401 to perform a set of operations, or steps, S102-S120. These operations, or steps, S102-S120 will be disclosed below. For example, the storage medium 603 may store the set of operations, and the processing circuitry 601 may be configured to retrieve the set of operations from the storage medium 603 to cause the resource location mapping node 301, 401 to perform the set of operations. The set of operations may be provided as a set of executable instructions. Thus the processing circuitry 601 is thereby arranged to execute methods as herein disclosed.

The storage medium 603 may also comprise persistent storage, which, for example, can be any single one or combination of magnetic memory, optical memory, solid state memory or even remotely mounted memory. The resource location mapping node 301, 401 may further comprise a communications interface 602 for communications with at least a gateway a resource directory and a domain name server. The processing circuitry 601 controls the general operation of the resource location mapping node 301, 401 e.g. by sending data and control signals to the communications interface 602 and the storage medium 603, by receiving data and reports from the communications interface 602, and by retrieving data and instructions from the storage medium 603. Other components, as well as the related functionality, of the resource location mapping node 301, 401 are omitted in order not to obscure the concepts presented herein.

Figure 7:
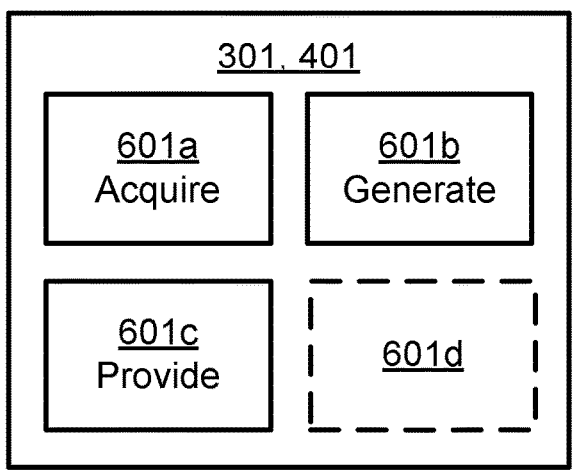
FIG. 7 is a schematic diagram showing functional modules of a resource location mapping node according to an embodiment.

FIG. 7 schematically illustrates, in terms of a number of functional modules, the components of a resource location mapping node 301, 401 according to an embodiment. The resource location mapping node 301, 401 of FIG. 7 comprises a number of functional modules; an acquire module 601a configured to perform below steps S102, S110, S116, a generate module 602 configured to perform below step S104, S104a, S112, S118, and a provide module 603 configured to perform below step S106, S106a, S106b, S114, S120. The resource location mapping node 301, 401 of FIG. 7 may further comprises a number of optional functional modules, such symbolized by the further functional module 601d. The functionality of each functional module 601a-601c will be further disclosed below in the context of which the functional modules 601a-601c may be used. In general terms, each functional module 601a-601c may be implemented in hardware or in software. Preferably, one or more or all functional modules 601a-601c may be implemented by the processing circuitry 601, possibly in cooperation with functional units 602 and/or 603. The processing circuitry 601 may thus be arranged to from the storage medium 603 fetch instructions as provided by a functional module 601a-601c and to execute these instructions, thereby performing any steps as will be disclosed hereinafter.

Figure 6:
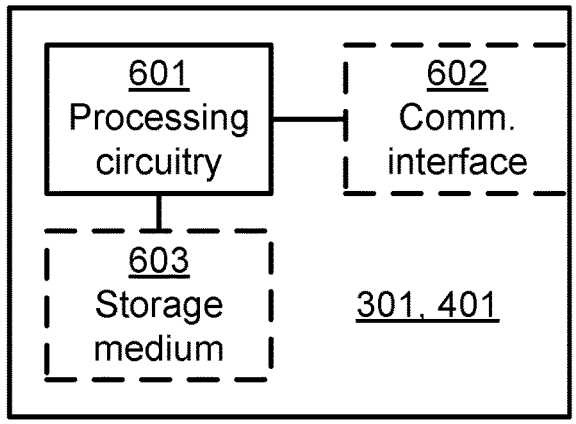
FIG. 6 is a schematic diagram showing functional units of a resource location mapping node according to an embodiment.

The resource location mapping node 301, 401 may be a separate node, or a functional node provided in the GW. Additionally or alternatively, one resource location mapping node 301, 401 may server several GWs. Further, although a single processing circuitry 601 is illustrated in FIG. 6 the processing circuitry 601 may be distributed among a plurality of devices, or nodes. The same applies to the functional modules 601a-601d of FIG. 7 and the computer program 802 of FIG. 8 (see below).

FIG. 8 shows one example of a computer program product 801 comprising computer readable means 803. On this computer readable means 803, a computer program 802 can be stored, which computer program 802 can cause the processing circuitry 601 and thereto operatively coupled entities and devices, such as the communications interface 602 and the storage medium 603, to execute methods according to embodiments described herein. The computer program 802 and/or computer program product 801 may thus provide means for performing any steps as herein disclosed.

In the example of FIG. 8, the computer program product 801 is illustrated as an optical disc, such as a CD (compact disc) or a DVD (digital versatile disc) or a Blu-Ray disc. The computer program product 801 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 802 is here schematically shown as a track on the depicted optical disk, the computer program 802 can be stored in any way which is suitable for the computer program product 801.

Figure 9:
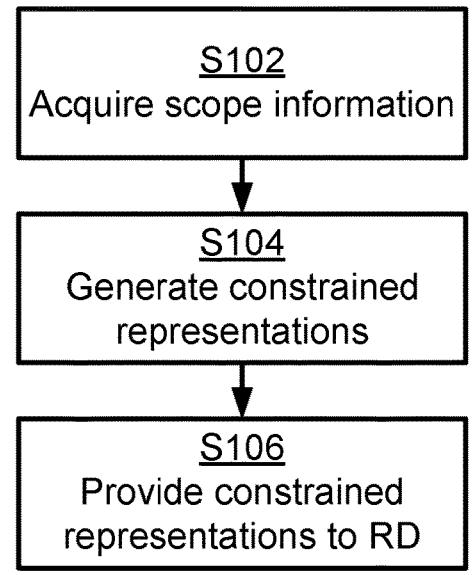
FIGS. 9 and 10 are flowcharts of methods according to embodiments.
Figure 10:
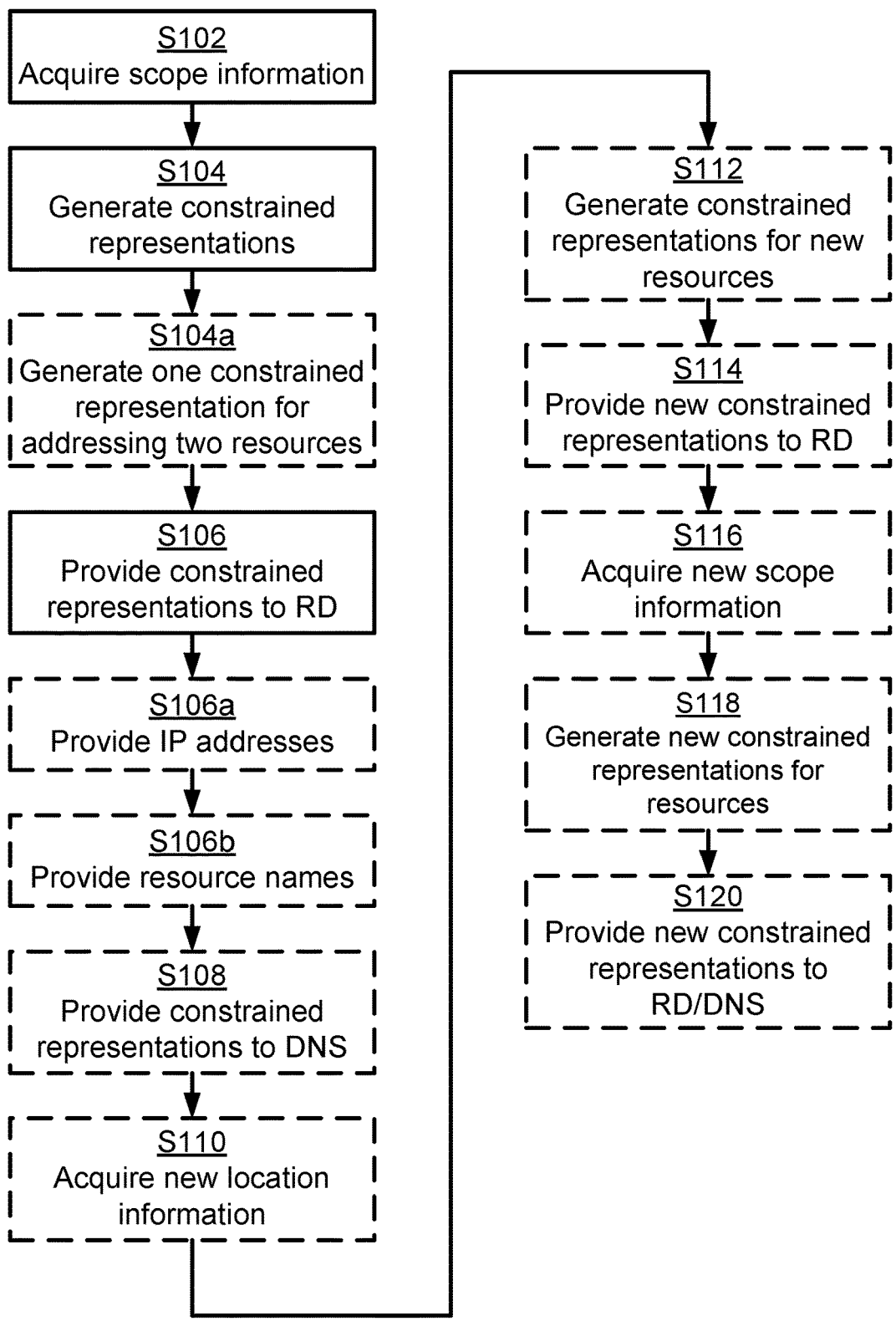

FIGS. 9 and 10 are flow charts illustrating embodiments of methods for making resources 106, 107, 108, 109, 110 discoverable. The methods are performed by the resource location mapping node 301, 401. The methods are advantageously provided as computer programs 32.

Reference is now made to FIG. 9 illustrating a method for making resources 106, 107, 108, 109, 110 discoverable as performed by the resource location mapping node 301, 401 according to an embodiment.

The resource location mapping node 301, 401 is configured to, in a step S102, acquire scope information of a local network and location information. The local information enables determination of specific locations of resources in the local network. The location information may be acquired from a gateway (GW) of the local network. Examples of scope information, local information, and resources will be provided below. For example, the location information may comprise an iBF bit string.

The acquired information is used to generate constrained resource identifiers of the resources. Particularly, the resource location mapping node 301, 401 is configured to, in a step S104, generate Constrained Application Protocol (CoAP) resource identifiers of the resources from the scope information and the location information. The CoAP resource identifiers may be provided as CoAP resource Uniform Resource Identifiers (URIs). Examples of how the CoAP resource identifiers may be generated will be provided below.

These CoAP resources are then published. Therefore, the resource location mapping node 301, 401 is configured to, in a step S106, provide the CoAP resource identifiers to a resource directory (RD) 412. The resources are thereby made discoverable. Further examples of how the CoAP resources may be published will be provided below.

The scope information may describe a hierarchical structure based on types of information provided by the resources in the local network. For example, the scope information may be provided as a set of ICN scopes.

There are different examples of resources. In general terms, a resource may be defined as a network data object or service that can be identified by a URI. Resources may be available in multiple representations (e.g. multiple languages, data formats, size, and resolutions) or vary in other ways. For example, each resource may correspond to at least one of a node, a data item, and a physical device (such as a machine device, sensor, or Internet of Things (IoT) device) in the local network. Since the local network may be an ICN network the resources may be regarded as ICN resources.

An RD that is aware of the ICN nature of the local network hosting the resources may thereby map the ICN scopes (as represented by the CoAP resources) into URI paths. For example, in view of the above presented illustrative example, the scope "house:groundfloor:light1" could map to a URI "/house/groundfloor/light1/". For an Internet host this would appear like a regular URI, but when a query for such URI reaches the gateway to the ICN network, the URI can be mapped to an ICN scope and be sent to the host(s) belonging to that scope using ICN forwarding.

As will be further disclosed below, the herein disclosed embodiments allow mapping from a single unicast IPv6 address, assigned to a resource at the RD, to multiple hosts in the local network. The IPv6 address may comprise information that allows non-IP based forwarding in the local network to use multicast to all the required destination resource.

Reference is now made to FIG. 10 illustrating methods for making resources 106, 107, 108, 109, 110 discoverable as performed by the resource location mapping node 301, 401 according to further embodiments.

In some embodiments the local networks behind the GW are not IP-based, but they use iBF-based forwarding mechanism. This local network is connected to the IPv6 Internet using a GW that is aware of both forwarding mechanisms, (see FIG. 2).

The GW is responsible for making a mapping between the external IPv6 address of the local network host (hosts) and the iBF that is used to forward the packet from the GW to the resource. This can be accomplished e.g. using an iBF network address translator. The mechanism can be based on e.g. mapping an external IPv6 address, assigned to a specific resource at the GW to an existing iBF leading from the GW to that resource, or the IPv6 address itself can be formed so that the host part of the address is the iBF, and where the GW removes the prefix part of the IPv6 address and uses the host part as the iBF to deliver the packet to the resource.

When a resource in a local network sends a registration towards the GW, it may include an empty 64-bit iBF collecting field in the packet. Each router 203, 207 inside the local network may include the incoming interface's link identity (Lid) in the collector field by logically OR-ing the Lid with the current content of the collector field. Once the packet arrives to the GW, residing between the local network and the IPv6 network, the GW may thereby obtain the collector field from the packet and generate an IPv6 address for the registering resource by combining the local network's 64-bit prefix with the 64-bit iBF in the registration packet.

The GW may contact the resource location mapping node 301, 401. The GW registers the published information and scopes to the resource location mapping node 301, 401, which is responsible for maintaining the information of the local network. Thus, the resource location mapping node 301, 401 has knowledge of the local network, and the corresponding scopes that have been defined to make meaningful groups of the resources in the local network (e.g. "light sensors", "3rd floor rooms", etc.), and the corresponding iBF-based IP-addresses for each of the resources.

In addition, the resource location mapping node 301, 401 can generate additional IP addresses, that may have multiple destination iBFs included. Particularly, according to an embodiment the resource location mapping node 301, 401 is configured to generate the CoAP resource identifiers by, in a step S104a, generate one CoAP Uniform Resource Identifier (URI) for addressing at least two resources in the local network by combining the suffixes of the at least two resources. The resource location mapping node 301, 401 may merge two iBFs using a logical OR operation between them, creating a new iBF. Hence, the CoAP URI for addressing the at least two resources may be the result of performing a bit-wise logic OR-operation between the suffixes of the at least two resources.

Figure 4:
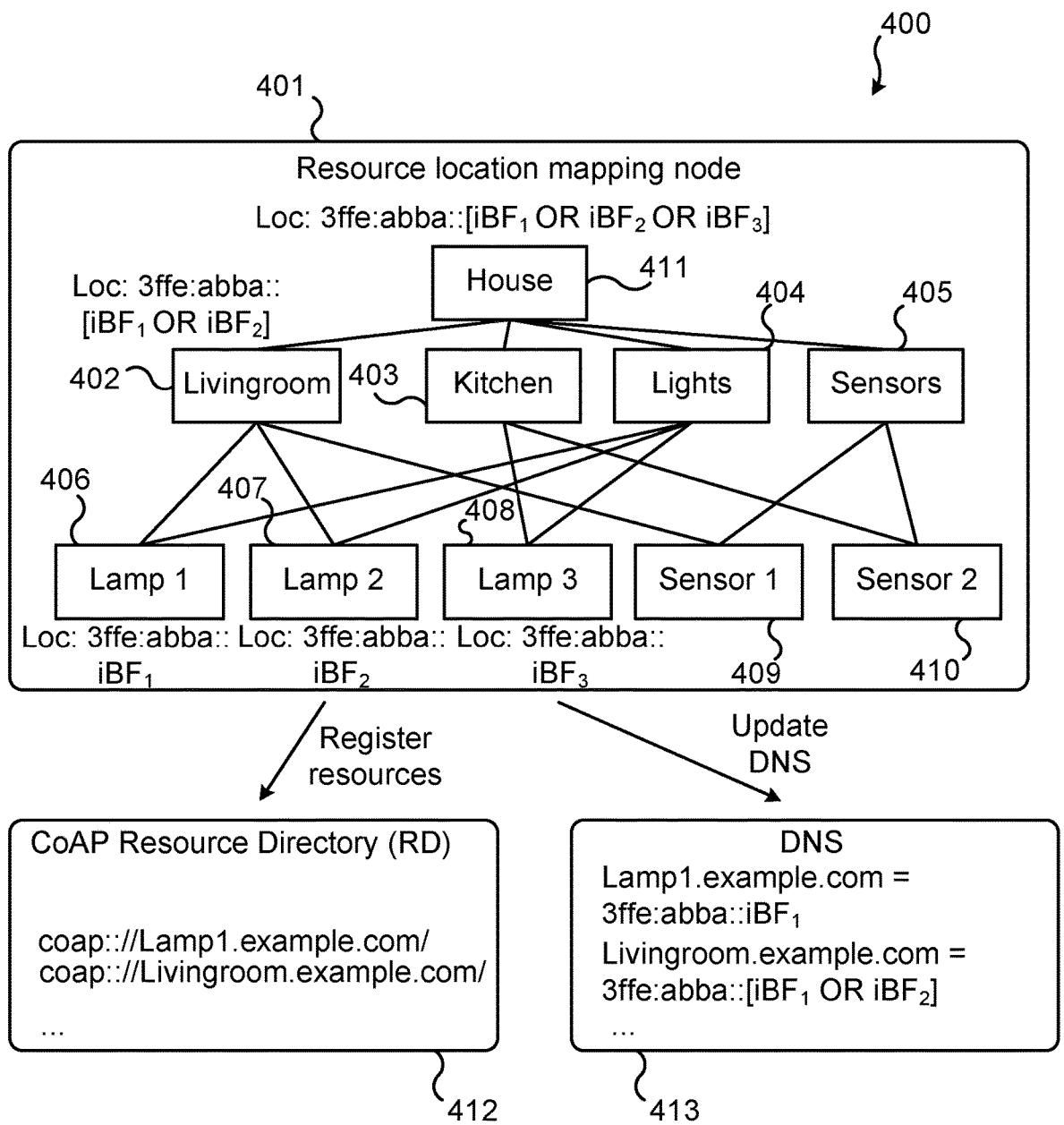
FIG. 4 is a schematic diagram illustrating an arrangement comprising a resource location mapping node, a resource directory, and a domain name server according to embodiments.

For example, with reference to the illustrative example of FIG. 4, both Lamp1 and Lamp2 have iBF-based IP-addresses. These addresses can be used to contact the lamp resources, correspondingly. The resource location mapping node 301, 401 may therefore generate an additional IPv6 address by using a bitwise OR operation for the iBF parts of Lamp1 and Lamp2 addresses, resulting in a new IPv6 address. When this IPv6 address is used, the information is actually delivered to both Lamp1 and Lamp2 in the local network. This allows a higher level scope to be mapped to a single CoAP URI, describing a resource, at the Internet side. Thus, according to an embodiment the CoAP URI for addressing the at least two resources represents a higher level scope information compared to the scope information of the at least two resources.

Figure 1:
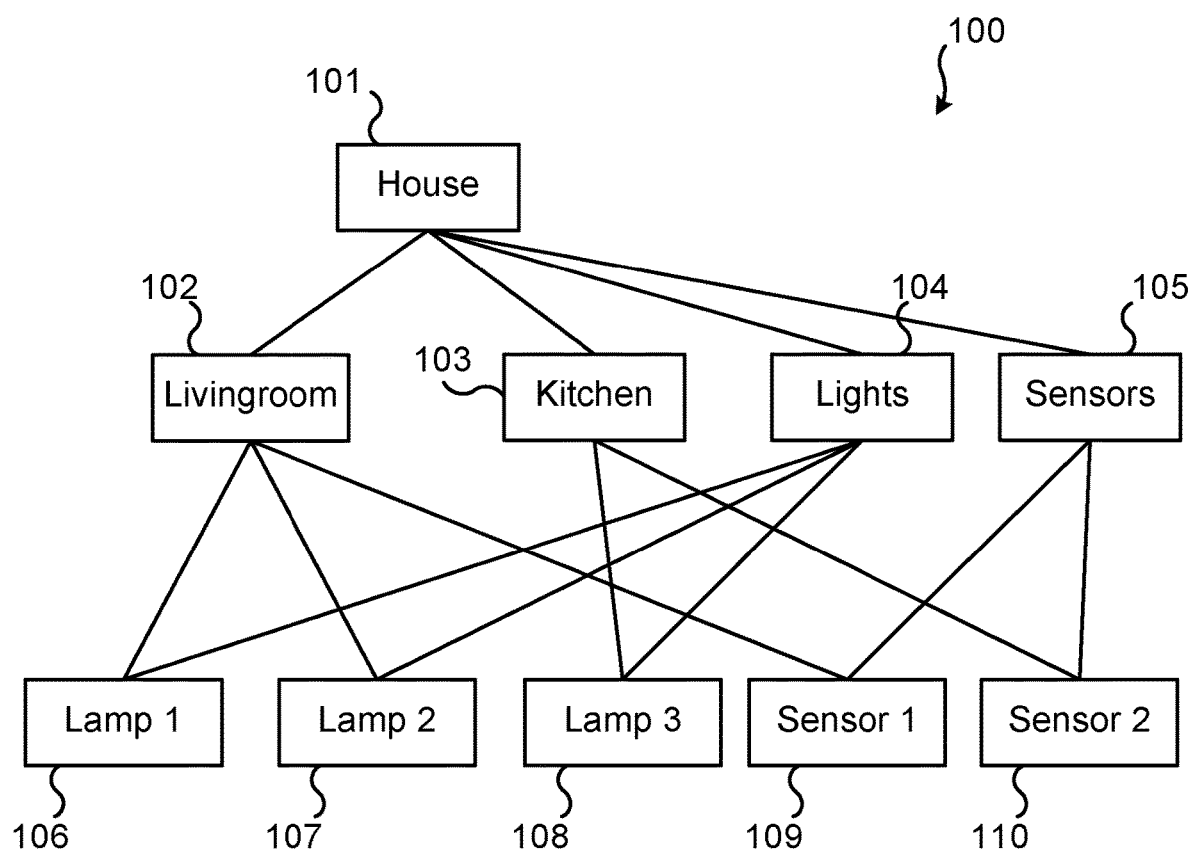
FIG. 1 is a schematic diagram illustrating a hierarchical structure of scope based information identification according to embodiments.

FIG. 4 provides a schematic illustration of an arrangement 400 comprising a resource location mapping node 401 providing information to a resource directory 412 and a domain name server 413. The resource location mapping node 401 schematically holds a representation of the hierarchical structure 100 of scope based information identification of FIG. 1. Hence, this hierarchical structure comprises a top level as represented by the entity House 411. One level below the entity House are the entities Livingroom 402, Kitchen 403, Lights 404, and Sensors 405. Finally, on a bottom level are entities Lamp1 406, Lamp2 407, Lamp3 408, Sensor1 409, and Sensor2 410 representing resources.

In FIG. 4, the resource location mapping node 301, 401 maintains the scopes of the local network. Using the received address information for the specific resource (e.g. Lamp 1), the resource location mapping node 301, 401 may generate additional resources. These resources are virtual, because there is no physical device representing this particular resource. For example, the resource location mapping node 301, 401 may generate a new resource Livingroom based on the scopes published by the GW and assign it a new IP address. This IP address suffix part may comprise subscopes, or publishers, under it. In the illustrative example of FIG. 4 these publishers are Lamp 1 and Lamp 2, which both exist in the house.

The In-packet Bloom filters feature may be used to merge paths. When the GW requires to send packets to both Lamp1 and Lamp2, it may perform a bitwise OR operation between $iBF_1$ and $iBF_2$. This operation gives a new iBF and when using this iBF from the GW, the local network will multicast the packet to both Lamp1 and Lamp2. The IP address for the virtual resource Livingroom is created by adding the iBF merged from the two iBFs for the lamps as the suffix to the local network's prefix, resulting in address $IPv6_{livingroom}$.

As noted above the resource location mapping node 301, 401 registers resources to the RD (see FIG. 3), as in step S106. These registrations may comprise URIs that point to certain IPv6 addresses, containing the iBF as the host part. Thus, the RD may not be aware of the iBF nature of the local network and to which resources the IPv6 address actually points.

Figure 3:
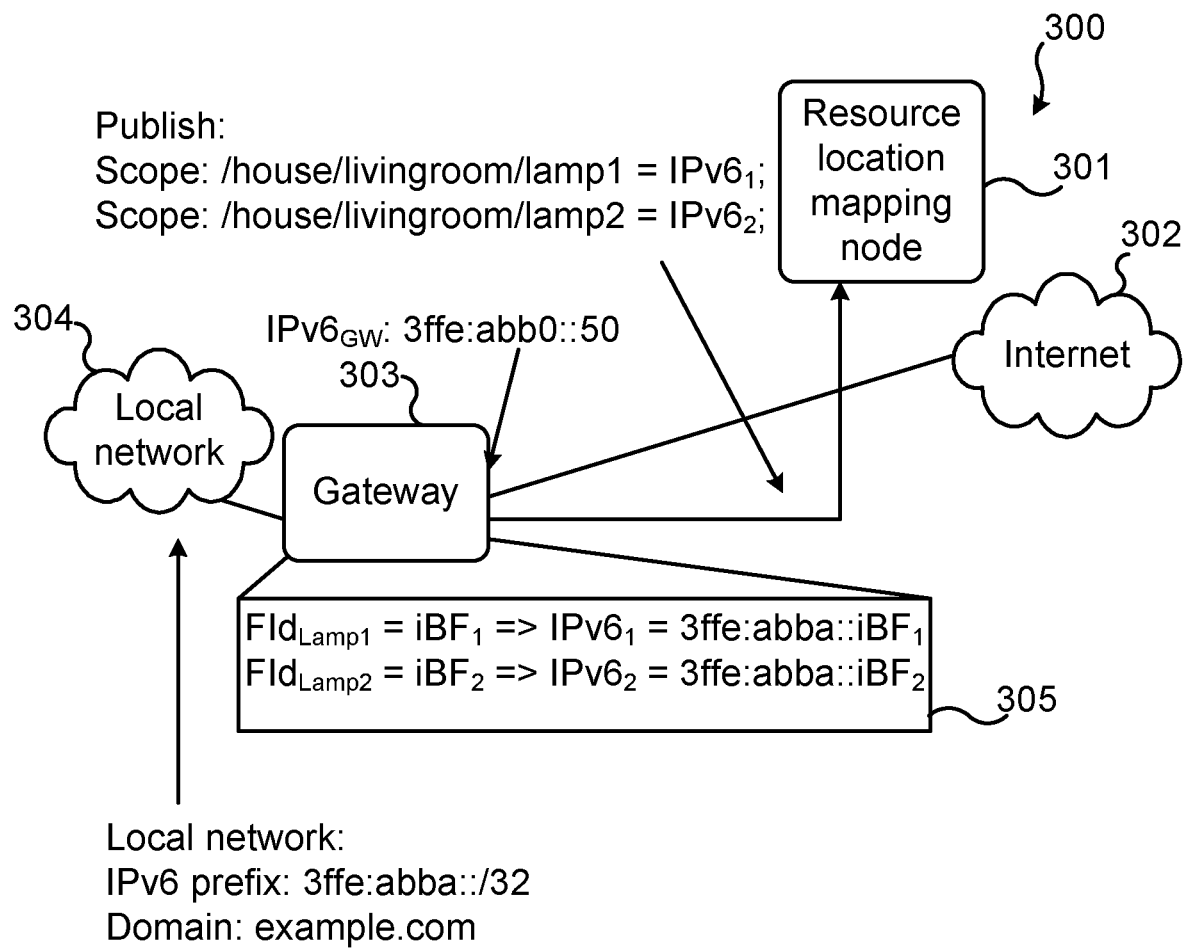
FIG. 3 is a schematic diagram illustrating an arrangement for registration of scopes and resources in the physical arrangement of FIG. 2 according to embodiments.

FIG. 3 is a schematic illustration of an arrangement 300 for registration of scopes and resources in the physical arrangement of FIG. 2. Hence, the arrangement 300 is similar to the physical arrangement 200 and comprises a local network 304 operatively connected to an external network (Internet) 302 via a gateway 303. The gateway 303 is in turn operatively connected to a resource location mapping node 301. The gateway (GW) 303 maintains the Forwarding Identifier (FId) information 305 to each resource in the local network 304.

In FIG. 3, the GW generates IPv6 addresses for each of the resources in the local network. Thus, according to an embodiment the location information is provided as individual IP addresses of all resources.

This may be achieved by using the assigned IPv6 prefix of the local network as the address prefix and adding an iBF bit string to the suffix part of the address. Thus, according to an embodiment the IP address comprises a prefix identifying the local network and a suffix identifying the individual resources in the local network. The suffix may be provided by the iBF bit string. The prefix may as well as the iBF may be 64 bits long. In some cases the prefix part can be shorter and the iBF, correspondingly, longer. The GW may publish this information to the resource location mapping node 301, 401 that maintains the ICN scope and publication information (as described in FIG. 1).

Adding new resources to the local network may require that the new resources register themselves to the GW and, further, that the information that they publish is put under the correct scope in the scope system at the GW and at the resource location mapping node 301, 401. Therefore, according to an embodiment the resource location mapping node 301, 401 is configured to, in a step S110, acquire new location information enabling determination of a specific location of a new resource in the local network. In this embodiment the resource location mapping node 301, 401 is further configured to, in a step S112, generate a CoAP resource identifier of the new resource by associating the scope information with the new location information. The resource location mapping node 301, 401 further registers these new devices and their published information as new resources to the RD. In this embodiment the resource location mapping node 301, 401 is therefore further configured to, in a step S114, provide the CoAP resource of the new resource to the RD, thereby making the new resource discoverable.

The resource location mapping node 301, 401 may further be configured to, in a step S116, acquire new scope information of the resources. Further, the resource location mapping node 301, 401 may be configured to, in a step S118, generate new CoAP resource identifiers of the resources by associating the new scope information with the location information. For example, when the resource location mapping node 301, 401 receives new scopes or publishing resources under some existing scope, it can update the higher level scope's IPv6 address by including this new iBF-part of the new resources in the IPv6 address' host part by bitwise OR-ing it there.

The resource location mapping node 301, 401 can update this information to a domain name server (DNS) 413 by just sending the new IP address for a certain host name registered in the DNS. Thus, according to one embodiment the resource location mapping node 301, 401 is configured to, in a step S120, provide the new CoAP resource identifiers to at least one of the RD and the DNS.

For example in FIG. 4 (see below), the resource location mapping node 301, 401 has registered the IP address of the living room, the IP address comprising $iBF_1$ and $iBF_2$ in the suffix part. If a third Lamp is added to Livingroom, the resource location mapping node 301, 401 may generate a new IPv6 address for Livingroom, comprising also the iBF to the new lamp, and update it in the DNS. For this part, the RD does not need to be updated. Further, the new lamp can also be registered in the RD as a new independent resource, in a similar way as Lamp1 and Lamp2.

When a CoAP client requests data from e.g. all Livingroom resources by querying from the RD, the CoAP client will receive the corresponding CoAP URI (coap://livingroom.example.com/). It resolves the host name from the DNS and obtain the IP address for Livingroom. The prefix part of the IPv6 address will route the request through the Internet to the GW. When the GW receives the request, it will convert the IP-packet to iBF packet and use the host part of the destination IPv6 address as the iBF. Since this address can be generally by logically OR-ing together the received iBFs leading to Lamp 1 and Lamp 2, the packet will be delivered to both Lamps using iBF forwarding in the local network.

When the resources, i.e. the lamp devices in the present illustrative example, answer to the request the GW translates the hosts ICN scope into an IPv6 address that can be used for further communication with the resources. The mapping at the GW can be performed either so that the IPv6 address comprises only the iBF of the answering lamp as the address suffix, or the same iBF that was used when the request arrived from the CoAP client in the Internet.

As noted above, the resource location mapping node 301, 401 registers all the resources in the CoAP RD, as in step S106. This can be achieved either by providing the IP address of the resource to the RD (e.g. coap://[3ffe:abba:[$iBF_1$ OR $iBF_2$]] or by giving only the resource name (e.g. coap://livingroom.example.com/) and updating the corresponding address information in the DNS (e.g. livingroom.example.com=3ffe:abba:[$iBF_1$ OR $iBF_2$]. Hence, the resource location mapping node 301, 401 may be configured to, in a step S106a, provide information about locations of the resources to the RD. Step S106a may involve step S106b or step S106c. According to step S106b the resource location mapping node 301, 401 is configured to provide IP addresses of the CoAP URI to the RD.

According to step S106c the resource location mapping node 301, 401 is configured to provide resource names of the CoAP URI to the RD.

In order to enable the corresponding address information in the DNS (e.g. livingroom.example.com=3ffe:abba:[iBF$_1$ OR iBF$_2$]) to be update the resource location mapping node 301, 401 may be configured to, in a step S108, provide the CoAP resource identifiers to the DNS 413 of the local network.

Each lamp resource that the resource location mapping node 301, 401 maintains in FIG. 4 has the registered IPv6 address. The RD registers the scopes and publications as resources in the RD. When a CoAP client in the Internet requests e.g. resource Lamp 2 from the RD, it will receive the IPv6 address 3ffe:abba:iBF$_2$ as the location from where it can query the data.

When the client uses the IPv6 address that it received from the RD, the data request packet is delivered to the GW. The GW removes the prefix part from the IPv6 address and uses the iBF in the suffix part to deliver the packet to the iBF-based local network. For requests to Lamp2, the destination IPv6 address is 3ffe:abba::iBF$_2$, and from the GW, the packet is delivered to the local network using the suffix part iBF$_2$. The request is delivered to Lamp2. However, if the client wanted to have information from/House/Livingroom, the IPv6 address has different suffix. Removing the prefix gives an iBF that contains both iBF$_1$ and iBF$_2$, and the network delivers the same request to both Lamp1 and Lamp2. Thus, the client will receive data from both of these resources.

Two or more resources may be addressed under a common scope by using a suitable URI in the RD and in the requests (e.g. coap://livingroom.example.com/). The RD resources are illustrated in FIG. 5. FIG. 5 schematically illustrates a resource directory 501. The resource directory 501 of FIG. 5 is exemplified by an illustration of addressing specific resources (e.g. physical devices or possibly other virtual resources) under the virtual resource Livingroom. The CoAP client requests for a resource from the RD. With coap://livingroom.example.com/ the client will receive information from all publishing resources under the scope Livingroom. However, if the client requests for a resource with URI "Lamp1", the IP address is the same (i.e. the IP address of "livingroom.example.com"), the request is delivered to all the resources under "Livingroom", but only Lamp1 finds its own resource described in the URI. The other resources receiving the request do not find themselves in the URI in the request, and they will drop the request. Thus, one difference to the previously mentioned addressing of specific resource (e.g. coap://Lamp1.example.com), is that now the CoAP client sees the "livingroom.example.com" as the receiver and obtains the IP address that points actually to both Lamp1 and Lamp2 in the local network. However, now "Lamp1" is inserted in the requested URI and although both lamps receive the request, the resource in the URI matches only Lamp1 and not Lamp2. Thus, the only answer comes from Lamp1. This allows the CoAP clients to assign the resources in a flexible way.

In summary, there has been provided efficient mechanisms for making resources of an ICN-based local network using iBF addressing available to IP networks with IP and CoAP URI resource addressing with iBF and scope creation together with RD and local network address translation. Mapping of CoAP URIs is enabled to multiple actual resources, where the resource's IPv6 address comprises a multicast in-packet Bloom filter. Multiple resources may be mapped to a single CoAP resource at the resource location mapping node 301, 401. Resources may be made addressable by combining multiple iBF-based IPv6 addresses into a single IPv6 address, where the newly creates IPv6 address is actually a multicast iBF that multiplies the packet from the legacy IP node to all the targeted resources.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for making resources discoverable, the method being performed by a resource location mapping node, the method comprising:
the resource location mapping node acquiring scope information of a local network and location information enabling determination of specific locations of resources in the local network;
the resource location mapping node generating Constrained Application Protocol (CoAP) resource identifiers of the resources from the scope information and the location information; and
the resource location mapping node providing the CoAP resource identifiers to a resource directory (RD), thereby making the resources discoverable, wherein
at least one of the resources belongs to a category,
said scope information describes at least a structure of the resources and the category,
the location information is provided as a plurality of addresses each of which is for each of the resources, and
generating CoAP resource identifiers comprises generating one CoAP Uniform Resource Identifier (URI) for addressing at least two resources in the local network by performing a logic OR operation on suffixes included in the addresses of the at least two resources.

2. The method according to claim 1, wherein said structure is based on types of information provided by the resources in the local network.

3. The method according to claim 1, wherein said scope information is provided as a set of Information Centric Networking (ICN) scopes.

4. The method according to claim 1, wherein the location information comprises an in-packet Bloom filter bit string.

5. The method according to claim 1, wherein the CoAP resource identifiers are provided as CoAP resource Uniform Resource Identifiers (URIs).

6. The method according to claim 1, wherein each resource corresponds to at least one of a node, a data item, and a physical device in the local network.

7. The method according to claim 1, wherein the location information is acquired from a gateway (GW) of the local network.

8. The method according to claim 1, wherein each of the addresses is an individual Internet Protocol (IP) address of each of the resources.

9. The method according to claim 8, wherein each of the IP addresses comprises a prefix identifying the local network and a suffix identifying one or more individual resources in the local network.

10. The method according to claim 9, wherein the suffix is provided by an in-packet Bloom filter bit string.

11. The method according to claim 1, wherein the logic operation is a bit-wise logic OR-operation between the suffixes of the at least two resources.

12. The method according to claim 1, wherein the CoAP URI for addressing said at least two resources represents a higher level scope information compared to the scope information of said at least two resources.

13. The method according to claim 1, wherein the method further comprises:
providing information about locations of said at least two resources to the RD by:
providing Internet protocol (IP) addresses of the CoAP URI to the RD; or
providing resource names of the CoAP URI to the RD.

14. The method according to claim 1, wherein the method further comprises:
providing the CoAP resource identifiers to a domain name server (DNS) of the local network.

15. The method according to claim 1, wherein the method further comprises:
acquiring new location information enabling determination of a specific location of a new resource in the local network;
generating a CoAP resource identifier of the new resource by associating the scope information with the new location information; and
providing the CoAP resource identifier of the new resource to the RD, thereby making the new resource discoverable.

16. The method according to claim 1, wherein the method further comprises:
acquiring new scope information of the resources.

17. The method according to claim 16, wherein the method further comprises:
generating new CoAP resource identifiers of the resources by associating the new scope information with the location information.

18. The method according to claim 17, wherein the method further comprises:
providing the new CoAP resource identifiers to at least one of the RD and a DNS.

19. A resource location mapping node for making resources discoverable, the resource location mapping node comprising processing circuitry, the processing circuitry being configured to cause the resource location mapping node to perform a set of operations comprising:
acquiring scope information of a local network and location information enabling determination of specific locations of resources in the local network;
generating Constrained Application Protocol (CoAP) resource identifiers of the resources from the scope information and the location information; and
providing the CoAP resource identifiers to a resource directory (RD), thereby making the resources discoverable, wherein
at least one of the resources belongs to a category,
said scope information describes at least a structure of the resources and the category,
the location information is provided as a plurality of addresses each of which is for each of the resources, and
generating CoAP resource identifiers comprises generating one CoAP Uniform Resource Identifier (URI) for addressing at least two resources in the local network by performing a logic OR operation on suffixes included in the addresses of the at least two resources.

20. The resource location mapping node according to claim 19, further comprising a storage medium storing said set of operations, and wherein the processing circuitry is further configured to retrieve said set of operations from the storage medium to cause the resource location mapping node to perform said set of operations.

21. A computer program product for making resources discoverable, the computer program product comprising a non-transitory computer readable medium storing a computer program comprising computer code which, when run on processing circuitry of a resource location mapping node, causes the resource location mapping node to:
acquire scope information of a local network and location information enabling determination of specific locations of resources in the local network;
generate Constrained Application Protocol (CoAP) resource identifiers of the resources from the scope information and the location information; and
provide the CoAP resource identifiers to a resource directory (RD), thereby making the resources discoverable, wherein
at least one of the resources belongs to a category,
said scope information describes at least a structure of the resources and the category,
the location information is provided as a plurality of addresses each of which is for each of the resources, and
generating CoAP resource identifiers comprises generating one CoAP Uniform Resource Identifier (URI) for addressing at least two resources in the local network by performing a logic OR operation on suffixes included in the addresses of the at least two resources.

22. The method according to claim 1, wherein
said scope information describes at least a hierarchical structure comprising at least a top level, a middle level, and a bottom level,
the resources are identified at the bottom level, and
types of the resources and locations of the resources are identified at the middle level.

* * * * *